Feb. 9, 1960

A. L. GENOVESE 2,923,970

EXTRUSION APPARATUS

Filed Dec. 1, 1953

INVENTOR
Anthony L. Genovese

BY Karl W. Flocks
ATTORNEY

Feb. 9, 1960  A. L. GENOVESE  2,923,970
EXTRUSION APPARATUS
Filed Dec. 1, 1953  2 Sheets-Sheet 2

INVENTOR
Anthony L. Genovese,
BY Karl W. Flocks
ATTORNEY

United States Patent Office 2,923,970
Patented Feb. 9, 1960

2,923,970

EXTRUSION APPARATUS

Anthony L. Genovese, Odenton, Md., assignor to The National Plastic Products Company, Odenton, Md., a corporation of Maryland Application December 1, 1953, Serial No. 395,478

9 Claims. (Cl. 18—8)

The present invention relates to apparatus for use in the manufacture of artificial filaments by the hot melt extrusion process. More particularly, the present invention relates to a die assembly for use with a screw-type extrusion machine whereby artificial filaments formed of a thermoplastic material are more uniformly produced and may be extruded into various shapes and sizes.

In the production of thermoplastic monofilaments by the hot melt extrusion process, a screw-type extrusion machine is utilized, which incorporates a die provided with a plurality of openings or forming holes. The number and size of the forming holes in the die are normally dependent upon the type of material to be extruded and the end use of the filament. In the operation of the extruder, plastic material is forced through the forming holes in the die by the extruder screw to form a plurality of individual threads and the threads are then cooled, stretched and conveniently wound on bobbins. A function of the die, in addition to forming the threads, is to provide for the proper mixing of the thermoplastic composition since it is well known that thorough mixing of the plastic material is necessary prior to extruding in order that a high tenacity filament of uniform properties results. Prior to the instant invention, the extrusion dies known heretofore were formed in one piece, the one-piece die theoretically being designed to provide for the necessary mixing of the material to be extruded. However, in order to obtain the proper mixing of the plastic material, the heretofore known one-piece dies were constructed such that the forming holes were formed of considerable length or land. The increased land of the forming holes provided the necessary mixing of the plastic material, but considerably increased production problems since one-piece dies having long lands are difficult to machine such that all the openings are exactly the same size and, moreover, the die is considerably more difficult to clean due to the length of the forming hole openings. In addition, these heretofore known one-piece dies were frequently deflected by the high pressures present during the extruding operation.

In the extrusion of small diameter filaments, it is necessary to fabricate the dies such that the forming hole diameters are very small. In these heretofore known one-piece dies wherein small diameter filaments were extruded, the basic problem encountered was forming the small opening in the dies but retaining the relatively large lands necessary for proper mixing and for preventing deflection of the die. Not only was the boring operation laborious and oftentimes inaccurate, but the number of extruding or forming holes in each die was necessarily restricted to a minimum. However, it has been discovered that when the diameter of the forming hole is reduced in size, the land must also be reduced in order to prevent excessive back pressure which results in die deflection and especially to prevent the depositing of inorganic stabilizers and pigments that normally form a part of the plastic composition to be extruded. When these compounds are deposited in the die lands, irregular fiber characteristics, short runs and low fiber strength can result. Counterboring the forming hole in order to shorten the land has been attempted, but has been found unsatisfactory since it weakens the die to such an extent that the die deflects under pressure of the plastic material, thereby causing poor seating and resulting in the plastic collecting in the seating and decomposing. Moreover, the counterbore reduces the mixing action of the die, which action is generally necessary for satisfactory extrusion. The heretofore known one-piece dies were furthermore unsatisfactory since an even distribution of pressure at the forming holes was not always obtained, thus often resulting in non-uniform filaments being extruded.

The present invention provides a two-piece die assembly that not only incorporates a mixing die but, in addition, includes an extruding die. The mixing die is formed with openings having sufficient lands to provide for the proper mixing of the plastic material while the extruding die is formed of a relatively thin plate having openings provided with short lands to prevent excessive back pressures. The mixing die thereby acts to prevent deflection of the extruding die and further prevents the deposit of inorganic stabilizers and pigments. The mixing die is also provided with a surge manifold which is adapted to evenly distribute the material to be extruded to the forming holes or extruding openings and thereby provide for the uniform extrusion of the filaments. By employing a separate extruding die in the die assembly, it is also possible to form the extruding openings in any size or shape desired.

It is, therefore, an object of the present invention to provide apparatus for use with a screw-type extrusion machine, whereby artificial monofilaments of high tenacity are more uniformly produced.

Another object of the present invention is to provide a ring die for use with hot melt extrusion apparatus that is adapted to produce a plurality of artificial monofilaments having uniform properties, the extruding openings in the die being formed in various sizes or configurations.

Still another object of the present invention is to provide a die assembly for use with extrusion apparatus whereby extruder pressures are more uniformly distributed, thereby eliminating die deflection and resulting in the extrusion of more uniform filaments.

Still another object of the present invention is to provide a die assembly for use with extrusion apparatus wherein there is sufficient mixing of the plastic material prior to extrusion, resulting in filaments having uniform properties.

Still another object of the present invention is to provide a die for use with extrusion apparatus which is simple to fabricate and easy to install and clean.

Still another object of the present invention is to provide a die assembly that may be simply and quickly removed from engagement with the head of the extruder without resulting in the shut-down of the machine.

Other objects and the nature and advantages of the instant invention will be apparent from the following description taken in conjunction with the accompanying drawings, wherein.

Generally, the present invention includes a die assembly that is adapted to be attached to the head of an extruder machine. The die assembly includes a mixing die which receives the fluid thermoplastic material from the extruder and mixes it prior to introduction into the extruding die. The extruding die is formed with a plurality of extruding openings, the number of which will depend on the size and configuration of the filament desired. The plastic material is then extruded through the extruding openings into filaments which are cooled, stretched and then wound on bobbins for further handling.

Figure 1:
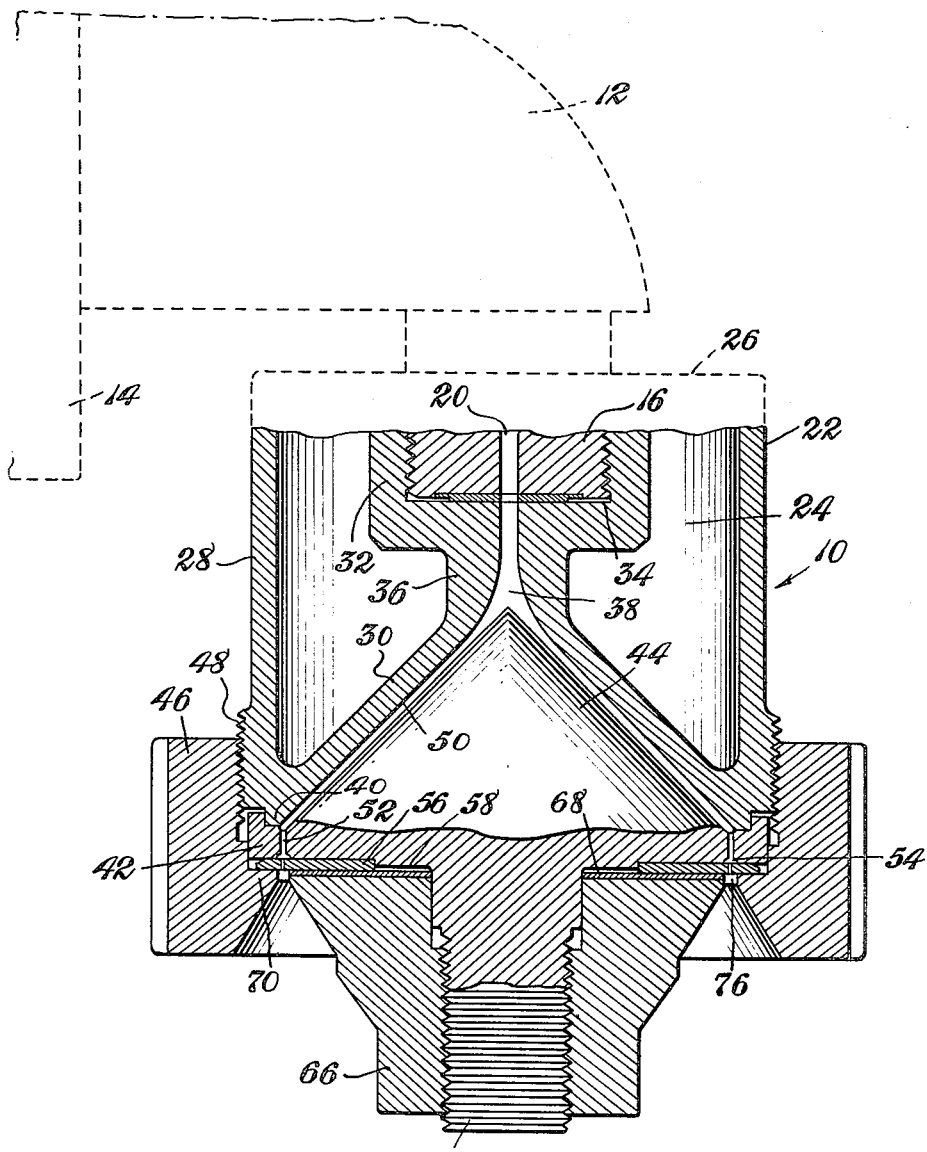
Fig. 1 is a vertical sectional view of the die apparatus embodied in the present invention.

Referring to the drawings, and particularly Fig. 1, a die assembly is illustrated generally at 10, and is secured to the head 12 of an extruder machine (not shown). The extruder head 12, which is shown in dotted lines in Fig. 1, is suitably secured to a flange 14 formed as part of the extruder machine body. The extruder head 12 further includes an integral threaded neck portion 16 formed on the underside thereof and which is adapted to receive the die assembly 10. Suitably formed in the flange 14 and extending into the extruder head 12 is a passage (not shown) which communicates with the interior of the extruder machine and is adapted to receive the fluid plastic material therefrom for introduction into the die assembly 10. Extending into the threaded neck portion 16 is a passage 20 which is formed as an extension of the passage formed in the extruder head 12.

The die assembly 10 inclues a fitting member 22 which has a chamber 24 formed therein defined by a top wall 26, shown in dotted lines, an annular side wall 28 and an annular lower conical wall 30. Extending inwardly into the chamber 24 and formed integral with the top wall 26 is an annular inner wall 32 which is provided with a recess 34 having threads formed therein to receive the threaded neck portion 16. The inner wall 32 extends into the conical wall 30, being joined thereto by the inner neck portion 36. Formed in the inner neck portion 36 is a central passage 38 which communicates with the passage 20 provided in the threaded neck portion 16.

Figure 2:
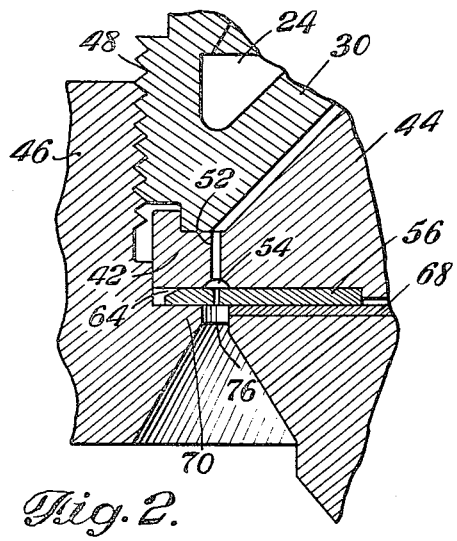
Fig. 2 is an enlarged portion of the apparatus illustrated in Fig. 1.

Referring now to Figs. 1 and 2, a shoulder 40 is shown formed on the lower portion of the fitting member 22, the shoulder 40 engaging an annular flanged end 42 formed as an integral part of a mixing or insert die 44. The annular flanged end 42 of the insert die 44 abuts against the shoulder 40 of the fitting member 22 and is securely held in position in a manner to be described hereinafter by an assembly fitting 46 which threadedly engages a lower threaded portion 48 formed on the fitting member 22. The body of the insert die 44 is formed with a conical configuration and when the die assembly 10 is assembled in position on the extruder head 12, a narrow annular passage 50 is formed between the body of the insert die 44 and the conical wall 30. The annular passage 50 communicates with the central passage 38 formed in the inner neck portion 36 of the fitting member 22, the central passage 38 being adapted to receive the plastic material from the extruder head 12 for introduction into the passage 50. Formed in the annular flanged end 42 of the insert die 44 and spaced at intervals adjacent the periphery thereof are a plurality of openings 52 which define mixing chambers. The openings 52 are formed large enough to prevent excessive pressures building up during the extruding of the plastic material and thereby prevent deflection of the die, but are sufficiently small enough to cause the plastic material to be thoroughly mixed and uniform prior to being extruded into filaments.

Referring particularly to Fig. 2, the mixing chambers 52 are shown extending into an annular groove or chamber 54 which is formed with a radial diameter greater than the mixing or homogenizing openings 52. The chamber or manifold 54 is provided for smoothing out fluctuations in the flow of the plastic from the extruder screw and, furthermore, compensates for any frictional differences occurring along the walls of the annular passage 50. Since the ordinary thermoplastic resins have been found to be compressible when extruded, the increased area or chamber 54 formed in the insert die 44 and located below the mixing openings 52 serves as a surge chamber compensating for pressure variations and frictional differences present in the die assembly flow passages and is thereby adapted to provide for an even distribution of pressure in the extruding orifices.

Figure 3:
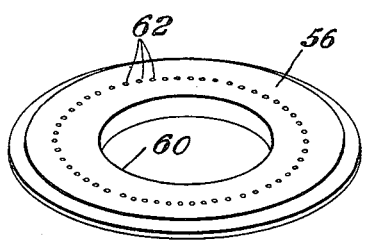
Fig. 3 is a perspective view of a ring die which is one element embodied in the instant invention.

The present invention contemplates the extrusion of small diameter filaments which thereby requires the utilization of an extruding die having small diameter forming holes or extruding openings formed therein. Since the use of the small diameter extruding openings requires a reduced land in order to prevent excessive pressures building up and the depositing of inorganic stabilizers and pigments, an individual flat plate or ring die 56 is provided and is adapted to be inserted around a central raised portion 58 of the insert die 44. As shown in Fig. 3, the ring die 56 is provided with a central opening 60 that fits over the raised portion 58 on the insert die 44, thereby locating the ring die 56 in the proper position. Formed in the body of the ring die 56 and positioned around the central opening 60 are a plurality of spaced openings or extruding opening 62 which are adapted to communicate with the annular groove or surge chamber 54. It is apparent that as the extruding openings 62 receive the plastic material from the surge chamber 54, a plurality of filaments will be extruded therethrough. The number of extruding openings in the ring die 56 can be varied wtih the size filament extruded and the shape of the filament desired. The openings in the ring die may be formed in any size or shape desired such as, for example, square or elliptical, the end use of the filament ultimately determining the desired configuration and size. Generally, the number of openings in the ring die will exceed that in the insert die and, since the surge chamber or manifold 54 is provided between the insert and ring dies, the plastic material will flow freely and continuously into the ring die without the building up of any excessive back pressures, which pressures heretofore caused die deflection.

In order to facilitate the removal of the ring die 56 from the assembly, the upper edge thereof is beveled whereby a space 64 is provided between the beveled edge of the ring die and the insert die 44. Thus, when the die assembly is disassembled for cleaning, a tool may be inserted in the space 64 to force the ring die 56 from engagement with the insert die 44. In the ring die 56, unlike die assemblies known heretofore, the land of the extruding openings 62 may be made as small as is necessary to produce the desired filament. Since the pressure of the plastic material is restricted to a small area in the extruding openings, the ring die can be formed in a relatively thin plate without resulting in appreciable deflection. Moreover, since the insert die 44 mixes the plastic material, the land of the forming holes of the ring die may be formed quite small. The insert die 44 also acts to break the pressure normally exerted on the ring die 56 and in addition serves as a feeding medium for the plastic material.

Referring again to Fig. 1, the insert die 44 is shown having a centrally disposed stud 64 formed integral with the body thereof. The stud 64 is threaded externally and is adapted to receive a retaining nut 66 having a centrally threaded opening. In order to securely retain the ring die 56 in position in the die assembly, a spacer 68 is provided which has a central opening for fitting over the stud 64. It is apparent that the retaining nut 66 abuts against the spacer 68 and thereby cooperates with the insert die 44 to firmly retain the ring die 56 in the die assembly. In order to firmly lock the outer edge of the ring die 56 in position, a shoulder 70 is formed on the assembly fitting 46 and cooperates with the lower portion of the flanged end 42 of the insert die 44 to lock the ring die 56 therebetween. It is apparent that by firmly securing the retaining nut 66 on the stud 64 and the assembly fitting 46 on the threaded portion 48 of the fitting member 22, the ring die 56 will be drawn into firm engagement with the insert die 44. As seen in Fig. 2, the spacer 68 is concentric with the shoulder 70 and is spaced therefrom to form an annular space 76, the annular space 76 being positioned directly below the forming openings 62 in the ring die and thereby providing a sufficient outlet for the filaments being extruded through the forming openings 62.

When disassembling the die assembly 10 from the extruder head 12, it is only necessary to disengage the die assembly from the threaded neck section 16. The die assembly 10 can then be separately broken down away from the machine by removing the retaining nut 66 and assembly fitting 46 to thereby remove the ring die 56 and the insert die 44 for cleaning or repairing. Immediately upon removal of the die assembly to be cleaned or repaired, a new die assembly is quickly and easily installed on the extruder head by simply screwing it on the neck portion 16 of the extruder head 12. It is apparent that by providing the die assembly 10 with the assembly fitting 22 having the internally threaded recess 34, the complete die assembly unit may be interchanged with another unit in a relatively short period of time and without costly shut-downs of the extruder machine.

Figure 4:
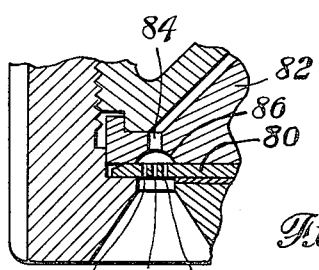
Fig. 4 is an enlarged portion in vertical section of a modification of the apparatus illustrated in Figs. 1–3.

Referring now to Fig. 4, a modification of the die assembly is illustrated and comprises essentially the same structural elements described in connection with Figs. 1 and 2. In the modification shown in Fig. 4, a modified ring die 80 is secured to an insert die 82, the insert die 82 being formed with mixing openings 84. Communicating with the mixing openings 84 and formed in the insert die 82 is an annular chamber or manifold 86, the chamber 86 being provided with a diameter that is somewhat greater than that of the chamber 54 illustrated in Figs. 1 and 2. Formed in the body of the ring die 80 are three rows of extruding openings 88, 90 and 92, which openings are drilled or punched in concentric circles. The extruding openings 88, 90 and 92 all communicate with the enlarged chamber 86 and thereby receive therefrom the material to be extruded. It is apparent that the enlarged chamber 86 allows for an equal distribution of plastic material to the rows of extruding openings 88, 90 and 92 and moreover provide for a uniform pressure distribution in all the extruding openings. It is furthermore apparent that by employing the ring die 80 which has the increased number of extruding openings formed therein, a greater number of filaments may be extruded in a single operation.

Figure 5:
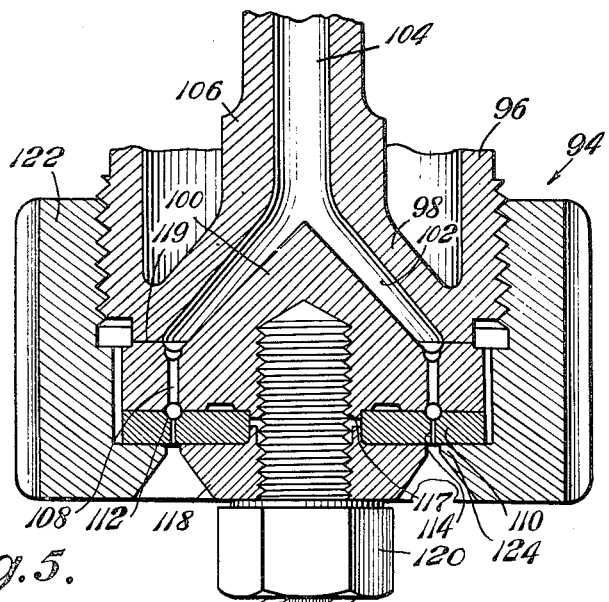
Fig. 5 is a vertical sectional view of a modification of a die assembly embodied in the present invention.

Referring now to Fig. 5, a second modification of the present invention is illustrated and comprises a die assembly generally indicated at 94. The die assembly 94 includes a fitting 96 which is directly connected to the extruder head (not shown) and forms an integral non-detachable unit therewith. The fitting 96 is formed with an annular conical wall 98 which cooperates with a conically shaped insert die 100 to form an annular passage 102. The annular passage 102 communicates with a passage 104 formed in a central portion 106, the central portion 106 being formed integrally with the annular conical wall 98. The passage 104 communicates with the interior of the extruder machine and receives the fluid plastic material therefrom, while the central portion 106 is formed as an integral part of the extruder head.

The insert die 100 is provided with a plurality of spaced openings 108 near the periphery thereof which extend around the body of the insert die and define mixing chambers, the function of which has been described hereinabove in connection with Figs. 1 and 2. Positioned below the insert die 100 is a ring die 110 which is provided with an annular groove 112 which communicates with the openings 108 and defines a surge chamber or manifold for the plastic material to be extruded. Spaced around the ring die 110 are a plurality of extruding openings or forming holes 114 through which the plastic material is adapted to be extruded into filaments. The openings 114 may be formed in any desired configuration such as, for example, square, diamond or elliptical shape, and may vary in diameter depending upon the end use of the filaments.

In order to secure the insert die 100 and the ring die 110 in position in the die assembly 94, a threaded stud 116 is provided and extends into an internally threaded opening 117 formed in the insert die. A retaining nut 118 threadedly engages the stud 116 and seats against the ring die 100 forcing it into firm contact with the insert die 100, the insert die 100, in turn, being moved into intimate contact with a shoulder 119 formed in the lower end of the conical wall 98. A lock nut 120 also threadedly engages the stud 116 and is provided for locking the retaining nut 118 in position on the stud. A locking member 122 completes the die assembly being provided with an internal thread for engaging a threaded portion formed on the outer wall of the fitting 96 and an annular shoulder 124 for engaging the outer portion of the ring die 110.

In order to disassemble the die assembly illustrated in Fig. 5, the locking member 122 must first be removed from engagement with the fitting 96. The lock nut 120 and the retaining nut 118 are then removed from the stud 116 allowing the ring die 110 and insert die 100 to be removed for cleaning or repairing.

It is apparent that the die assembly described hereinabove is particularly applicable in the extrusion of small denier filaments and particularly filaments of five mils or less. By eliminating the one-piece dies which were necessarily formed with extruding or forming openings having long lands, a greater number of filaments can be extruded by a single machine and die deflection is thereby eliminated. It is further apparent that the ring die may be formed with a greater or lesser number of extruding openings depending upon the size filament desired. Moreover, the ring die may be formed with any size or shape opening, thereby providing for the extrusion of various shapes and size filaments. By utilizing the insert die, the plastic material is conveniently mixed prior to extrusion and any excessive pressures are eliminated. Not only does the present invention increase the production of filaments, but shut-downs are less frequent and the loss of material to scrap is materially decreased. Furthermore, the present invention enables smaller diameter filaments to be produced having greater strength, and more accurate size control. In addition, due to the small openings in the ring die, resulting in smaller lands, the fabrication of the die assembly is greatly facilitated.

By utilizing the two-piece die assembly construction illustrated in Fig. 1, the entire die assembly as a unit may be removed from the extruder head. This facilitates maintenance and results in less shut-downs since an entirely new unit may be assembled on the extruder head without requiring the machine to be shut-down during the die assembly replacing operation.

It will be obvious to those skilled in the art that various changes may be made without departing from the spirit of the invention and, therefore, the invention is not limited to what is shown in the drawings and described in the specification, but only as indicated in the appended claims.

What is claimed is:

1. In a die assembly for extruding a thermoplastic material into filaments, a fitting having a conically shaped lower chamber formed therein and a central passage formed in the upper portion thereof, said central passage communicating with said lower conical chamber, a first die means having an annular flange and a conical body joined to the flange, the conical body of said first die means extending into said conical chamber of said fitting and forming an annular passage therewith, said annular passage communicating with said central passage, said annular flange of said first die means having a plurality of elongated openings of circular cross section formed therein, said elongated openings defining mixing chambers for said plastic material, a second die means comprising a flat ring secured to the lower face of said first die means, an annular groove formed in said first die means, said annular groove communicating with said mixing chambers and defining a surge manifold for evenly distributing the plastic material to said second die means and preventing the build-up of excessive pressures therein, and means for securing said second die means to said first die means, said second die means having extruding openings formed therein communicating with said manifold and receiving the plastic material therefrom.

2. In a die assembly for extruding plastic material, a first die having a conical body formed with an annular flange and cooperating with said conical body to define a base having a flat face, a plurality of openings formed in the annular flange of said first die and defining mixing means for said plastic material, a second die being defined by a flat ring, said flat ring having a plurality of openings extending therethrough, the second named openings communicating with the first named openings, said second die being positioned in intimate contact with said first die and the upper surface of said flat ring engaging said flat face of said first die in flush relation therewith.

3. In a die assembly for extruding a thermoplastic material into filaments, a fitting having a lower conical chamber and a central passage formed in the upper portion thereof, said central passage extending into the interior of said lower conical chamber, a conically shaped mixing die secured to said fitting and extending into said conical chamber and forming an annular passage therebetween, said annular passage communicating with said central passage for receiving the plastic material therefrom, a plurality of openings formed in said mixing die and communicating with said annular passage, said openings receiving the plastic material from said annular passage and mixing said plastic material prior to extrusion, an annular chamber formed in the bottom face of said mixing die and communicating with the openings in the mixing die, an extruding die comprising a flat ring engaging the underside of said mixing die in flush relation therewith, and having openings formed therein, said extruding die openings communicating with said mixing die openings, means for securing said extruding die to said mixing die, said annular chamber receiving the mixed plastic material from said openings in said mixing die for smoothing out fluctuations in said material prior to feeding into said extruding die, thereby providing for an even distribution of said material to said openings in said extruding die.

4. In a die assembly for extruding plastic material, a first die having a conicad body and a flanged end formed integral with said conical body, the base of said first die being formed with a flat face, a plurality of openings extending through the flanged end of said first die and communicating with said flat face, and a second die formed in a flat ring and having a plurality of openings formed therein, the second named openings communicating with the first named openings, said second die positioned in intimate contact with said first die, the upper surface of said flat ring engaging said flat face in flush relation therewith.

5. In a die assembly for extruding a plastic material into filaments, an extruder head, a fitting secured to said extruder head and adapted to be removed therefrom, said fitting being formed with a conical chamber, a conically shaped first die means secured to said fitting and being formed with an annular flange, said first die means being positioned in said conical chamber to define a passage therewith for receiving said plastic material, a plurality of mixing chambers formed in said first die means and communicating with said passage for mixing said plastic material to provide more uniform extruded filaments, a second die means comprising a flat ring secured to the underside of said first die means in flush relation therewith and having a plurality of extruding openings formed therein for extruding said material into filaments, an annular chamber formed between said first and second die means and providing communication therebetween, and an assembly fitting engaging said first-named fitting for securing said first and second die means to said first-named fitting.

6. In a die assembly for extruding plastic material, a fitting having a conical chamber, a first die having a conical body positioned in said conical chamber and defining a passage therewith, said first die having a flanged end formed with a plurality of openings that communicate with said passage, the base of said first die being formed with a flat face, a second die formed in a flat ring and having a plurality of openings formed therein, said second die being positioned in flush relation with the flat face of said first die, chamber means formed between said first and second dies and providing communication between the openings formed therein, and means for securing said second die to said first die.

7. In a die assembly for extruding a plastic material into filaments, a fitting, a first die means having a conical configuration secured to said fitting and defining therewith a passage for receiving said plastic material, an annular flanged formed on said die means at the base thereof, a plurality of mixing chambers formed in said annular flange for mixing said plastic material to provide more uniform extruded filaments, a second die means secured to said first die means, said second die means being defined by a flat ring having a plurality of extruding openings extending therethrough for extruding said material into filaments, said flat second die engaging the underside of said conically shaped first die in flush relation therewith, said second die means having an annular groove formed therein communicating with said mixing chambers and said extruding openings, said groove defining means for evenly distributing the plastic material to said extruding openings thereby eliminating pressure variations in the die assembly flow passages and preventing deflection of said die assembly.

8. In a die assembly for extruding plastic material into filaments, a fitting, a conically shaped first die means secured to said fitting and defining therewith a passage for receiving said plastic material, a flange formed on said first die means, means formed in said flange and communicating with said passage for mixing the plastic material, a chamber communicating with said mixing means for compensating for variations in pressure in the die assembly flow passages during the extruding operation, a second die means for extruding said plastic material into a plurality of filaments, said second die means defining a flat ring having concentric rows of extruding openings formed in the body thereof, said flat second die means engaging the underside of said conically shaped first die in flush relation therewith, and means for securing said second die means in engagement with said first die means.

9. In a die assembly for extruding plastic material into filaments, a fitting, a conically shaped first die means secured to said fitting and defining therewith a passage for receiving said plastic material, said first die means including an annular flange, a plurality of mixing chambers formed in said annular flange for mixing said plastic material to provide more uniform extruded filaments, a flat second die means secured to the underside of said conically shaped first die means in flush relation therewith, said second die means having concentric rows of extruding openings formed therein for extruding said material into filaments, and an annular chamber formed between said first and second die means, said chamber having a radial diameter greater than each of said mixing chambers and said extruding openings whereby said chamber compensates for pressure variations present in the die assembly flow passages thereby eliminating excessive back pressures in said flow passages and preventing deflection of said die assembly.

References Cited in the file of this patent

UNITED STATES PATENTS

| | | |
|---|---|---|
| 1,883,423 | Taylor | Oct. 18, 1932 |
| 1,983,330 | Welch | Dec. 4, 1934 |
| 1,999,072 | Allen | Apr. 23, 1935 |
| 2,045,722 | Pierrat et al. | June 30, 1936 |
| 2,295,942 | Fields | Sept. 15, 1942 |
| 2,398,729 | Taylor et al. | Apr. 16, 1946 |
| 2,499,398 | Lyon | Mar. 7, 1950 |
| 2,514,189 | Spencer et al. | July 4, 1950 |
| 2,543,027 | Jones | Feb. 27, 1951 |
| 2,792,122 | Munch et al. | May 14, 1957 |
| 2,848,737 | Poetter et al. | Aug. 26, 1958 |